United States Patent Office 3,106,557
Patented Oct. 8, 1963

3,106,557
PROCESS FOR THE PREPARATION OF
N-PHENYLPIPERAZINES
Fedor Poppelsdorf, Charleston, and Richard C. Myerly, South Charleston, W. Va., assignors to Union Carbide Corporation, a corporation of New York
No Drawing. Filed July 20, 1960, Ser. No. 44,006
6 Claims. (Cl. 260—268)

This invention relates to a novel process for the production of N-phenylpiperazines.

More specifically, this invention deals with the catalytic reaction of diethanolamines with an aromatic amine hydrohalide to yield N-phenylpiperazines.

The above reaction can be illustrated by the following

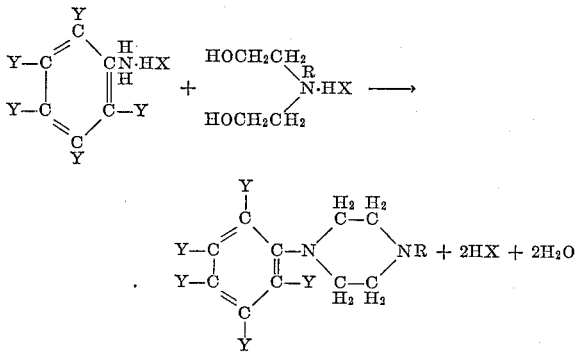

wherein R represents hydrogen or alkyl groups having from 1 to 4 carbon atoms; X represents chlorine, bromine or iodine; and Y individually represents alkyl groups having from 1 to 30 carbon atoms, fluorine, chlorine, bromine, iodine, a nitro group, a phenyl group, and hydrogen and 2 adjacent Y's together with the ring carbon atoms, to which they are bonded represent a benzenoid nucleus.

As can be seen from the above formula, the aromatic amine hydrohalide can be monocyclic or polycyclic.

Specific aromatic amine hydrohalides include the hydrochloride, hydrobromide and hydroiodide salts of aniline; mono, di, and trifluoroaniline; mono, di, and trichloroaniline; mono, di, and tribromoaniline; mono, di, and triiodoaniline; mono, and dinitroaniline; o-, m-, and p-toluidine; α- and β-naphthylamine; 2-, and 4-aminobiphenyl; 2-chloro-4-butylaniline; 2-methyl-3-octadecylaniline; 2-amino-7-octyl-naphthalene and the like.

Specific diethanolamine hydrohalides include the hydrochloride, hydrobromide and hydroiodide salts of diethanolamine, N-methyl-diethanolamine, N-ethyldiethanolamine, N-propyl-diethanolamine and N-butyl-diethanolamine.

The reaction of a diethanolamine hydrohalide to yield N-phenylpiperazines is well known in the art. However, the prior art methods necessitated the use of relatively high temperatures and prolonged reaction times.

Accordingly, it is the object of this invention to provide an improved process for the manufacture of N-phenylpiperazines wherein the productivity is much increased over what heretofore the art was unable to attain.

Another object of this invention is to provide a process which can effectively be conducted at temperatures below 190° C. so that steam heated equipment can be employed.

Another object of this invention is to provide a catalytic process which can effectively be conducted at temperatures below 210° C. to produce good yields of N-phenylpiperazines in comparatively short times as compared to the prior art non-catalytic processes.

It has now been found that the above objects can be achieved by employing an anhydrous hydrogen halide as a catalyst. The hydrogen halides which can be employed are hydrogen chloride, bromide, iodide and fluoride. The preferred hydrogen halides are hydrogen chloride and hydrogen bromide.

The following table illustrates the marked catalytic effect of the hydrogen halides.

TABLE I

Evidence for the Catalytic Effect of Hydrogen Chloride on the Interaction of Aniline Hydrochloride and Diethanolamine Hydrochloride to Form N-Phenylpiperazine [a]

| Reaction Temperature, ° C. | Reaction Time, Minutes | Hydrogen Chloride Passed Through Reaction Mass | Yield of N-Phenyl-piperazine, Percent |
|---|---|---|---|
| 185–189 | 120 | Yes [b] | 16.2 |
| 187–190 | 360 | Yes [b] | 32.8 |
| 219–221 | 60 | Yes [b] | 42.8 |
| 218–220 | 60 | No | 31.0 |

[a] Equimolecular quantities of aniline hydrochloride and diethanolamine hydrochloride were employed for each experiment and all experiments were done at atmospheric pressure with continuous stirring.
[b] Anhydrous hydrogen chloride passed into the reaction mass at the rate of 2.50 moles per hour per mole of aniline hydrochloride.

The temperature at which the reaction is conducted is not narrowly critical. Temperatures in the range of 185° to 240° C. have been found to be operative. The preferred range is 185°–190° C., so that steam heated equipment can be used.

The rate at which the anhydrous hydrogen halide is added can be any rate greater than 0.2 mole of hydrogen halide per hour per mole of the aromatic amine hydrohalide, at atmospheric pressures. The preferred flow rate of anhydrous hydrogen halide is from 0.2 to 4.4 moles per hour per mole of aniline hydrohalide at atmospheric pressure. When superatmospheric pressures are employed, effective flow rates can be smaller due to the increased solubility of the hydrogen halide in the reaction mixture under these conditions. In general, the flow rate at any pressure should be at least such that the number of moles of anhydrous hydrogen halide maintained in the system is equal to the sum of the number of moles of diethanolamine and aromatic amine.

The process of this invention is carried out by heating an aromatic amine hydrohalide and a diethanolamine hydrohalide to the desired temperature, and then adding the catalyst while maintaining the reaction mixture at the desired temperature. The proportion of the diethanolamine hydrohalide to aromatic amine hydrohalide is not narrowly critical. An excess of either reactant can be used. However, the preferred concentration is a 1:1 molar ratio.

It is to be understood that the aromatic amine hydrohalide and diethanolamine hydrohalide can be formed in situ by continuously adding the free amines to the reaction vessel and then adding the anhydrous hydrogen halide.

The desired product can be separated from the reaction mixture, after its basification, by conventional techniques such as extraction, distillation, etc.

The pyrolysis can also be conducted in the presence of an inert dispersant. The nature of the dispersant is not critical. The only conditions being that it is inert under the reaction conditions. Examples of dispersants include mineral oil, diphenyl ether, phenyl diphenyl ether, etc. The concentration of the dispersant is not critical and can be from 30–120 grams per mole of diethanolamine hydrohalide starting materials.

The following examples illustrate the invention:

EXAMPLE I

A mixture of diethanolamine hydrochloride (4 moles) and aniline hydrochloride (4 moles) was heated with stirring to 185°–189° C. whereupon a continuous stream of anhydrous hydrogen chloride was passed into the mixture by means of a sparging tube placed as far below the surface of the molten reactants as possible. The rate of flow of the hydrogen chloride was regulated at 10 moles per hour.

The mixture was kept with stirring under the foregoing conditions for 2.0 hours. At the end of this time the reaction mixture was cooled to 120° C. dissolved in cold water (500 cc.) and then made strongly alkaline to phenolphthalein at a temperature below 110° C. by the slow addition with stirring of aqueous 50 percent sodium hydroxide (720 g.).

The organic layer was separated at 50° C. and distilled under reduced pressure through a column having an efficiency of approximately 10 theoretical plates. The fraction of boiling point 115° C./2.0 mm. was substantially pure N-phenylpiperazine. Its weight was 105.4 g. which represented a yield of 16.2 percent of the theoretical.

No N-phenylpiperazine was obtained from the foregoing preparation when the hydrogen chloride treatment was omitted.

EXAMPLE II

Diethanolamine hydrochloride (4 moles) and aniline hydrochloride (4 moles) were caused to react in the same way as Example I but the reaction time was extended to 6 hours.

212.6 g. of N-phenylpiperazine was obtained which represented a yield of 34.8 percent of the theoretical.

EXAMPLE III

A mixture of diethanolamine hydrochloride (4 moles) and aniline hydrochloride (4 moles) was heated with stirring to 219–221° C. whereupon a continuous stream of anhydrous hydrogen chloride was passed into the mixture by means of a sparging tube placed as far below the surface of the molten reactants as possible. The rate of flow of the hydrogen chloride was regulated at 10 moles per hour.

The mixture was kept with stirring under the foregoing conditions for 60 minutes. At the end of this time, the reaction product was worked up according to the procedure of Example I to give 277.6 g. of N-phenylpiperazine which represented a yield of 42.8 percent of the theoretical.

EXAMPLE IV

A mixture of diethanolamine hydrochloride (4 moles) and aniline hydrochloride (4 moles) was heated with stirring at 218–220° C. for 60 minutes. At the end of this time, the reaction product was worked up according to the procedure of Example I to give 201.0 g. of N-phenylpiperazine. This represented a yield of 31.0 percent of the theoretical.

What is claimed is:

1. In the process for preparing N-arylpiperazines by the pyrolysis of a hydrohalide of an aromatic amine of the group consisting of alpha-naphthylamine, beta-naphthylamine, 2-amino-7-octyl-naphthalene and amines of the formula

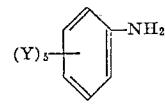

wherein each Y, individually, is of the group consisting of hydrogen, alkyl of 1 to 30 carbons, halogen, phenyl and nitro, in admixture with a hydrohalide of a diethanolamine of the formula

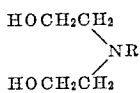

wherein R is of the group consisting of hydrogen and alkyl of 1 to 4 carbons, the improvement which comprises the step of passing anhydrous hydrogen halide through the admixture of said hydrohalide of the aromatic amine and said hydrohalide of the diethanolamine maintained at a temperature of 185° C. to 240° C. at an hourly rate of flow of at least 0.2 mol of anhydrous hydrogen halide per mol of the aromatic amine hydrohalide.

2. The process of claim 1 wherein R is hydrogen.

3. The process of claim 1 wherein the reaction is effected in an inert liquid dispersant.

4. The process of claim 1 wherein the passage of anhydrous hydrogen halide is at least that which maintains the number of mols of hydrogen halide in the admixture equal to the sum of the number of mols of the diethanolamine and the aromatic amine.

5. The process of claim 1 wherein said anhydrous hydrogen halide is hydrogen chloride and said hydrohalide of a diethanolamine is diethanolamine hydrochloride.

6. In the process for preparing N-phenylpiperazine by the pyrolysis of an admixture of aniline hydrochloride and diethanolamine hydrochloride, the improvement which comprises the step of passing anhydrous hydrogen chloride through said admixture maintained at a temperature of from 185° C. to 240° C. at an hourly rate of 0.2 to 4.4 mols of anhydrous hydrogen chloride per mole of aniline hydrohalide.

References Cited in the file of this patent

UNITED STATES PATENTS 2,636,032    Weston et al.           Apr. 21, 1953
2,843,590    Scigliano et al.         July 15, 1958

FOREIGN PATENTS 753,166      Great Britain           July 18, 1956

OTHER REFERENCES

Prelog et al.: Collection Czechoslovak Chem., Communication 7, pages 93–101.

Pollard et al.: Jour. Amer. Chem. Soc., volume 56, pages 2199–2200 (1934).